(12) United States Patent
Wetzig et al.

(10) Patent No.: US 8,171,773 B2
(45) Date of Patent: May 8, 2012

(54) SNIFFING LEAK DETECTOR

(75) Inventors: Daniel Wetzig, Cologne (DE); Norbert Rolff, Horrem (DE)

(73) Assignee: Inficon GmbH (DE)

( * ) Notice: Subject to any disclaimer, the term of this patent is extended or adjusted under 35 U.S.C. 154(b) by 405 days.

(21) Appl. No.: 12/311,581

(22) PCT Filed: Sep. 10, 2007

(86) PCT No.: PCT/EP2007/059452
§ 371 (c)(1),
(2), (4) Date: Apr. 3, 2009

(87) PCT Pub. No.: WO2008/043628
PCT Pub. Date: Apr. 17, 2008

(65) Prior Publication Data
US 2010/0005861 A1 Jan. 14, 2010

(30) Foreign Application Priority Data
Oct. 10, 2006 (DE) .......................... 10 2006 047 856

(51) Int. Cl.
*G01M 3/16* (2006.01)
(52) U.S. Cl. ....................................... 73/23.42; 73/40.7
(58) Field of Classification Search ................. 73/23.42, 73/40.7
See application file for complete search history.

(56) References Cited

U.S. PATENT DOCUMENTS 4,869,094 A * 9/1989 Kozuka et al. ................. 73/23.2
6,014,892 A * 1/2000 Baret et al. ...................... 73/40.7

FOREIGN PATENT DOCUMENTS

| DE | 4408877 | 9/1995 |
| DE | 4445829 | 6/1996 |
| DE | 102005021909 | 11/2006 |
| EP | 0718613 | 6/1996 |
| WO | 2006/120122 | 11/2006 |

OTHER PUBLICATIONS

International search report from corresponding international application No. PCT/EP2007/0059452 dated Dec. 20, 2007.

* cited by examiner

*Primary Examiner* — Hezron E Williams
*Assistant Examiner* — Paul West
(74) *Attorney, Agent, or Firm* — Ohlandt, Greeley, Ruggiero & Perle, LLP

(57) ABSTRACT

To achieve a large measurement range from small up to larger leakage rates, a switchover from normal operation to gross operation occurs. In gross operation, the sucked-in gas flow is separated by different throttles, wherein the throttle that leads to the test gas sensor has a low flow rate. This manner of operation prevents a too large quantity of test gas from reaching the sensor surface and contaminating the sensor. In another alternative, in gross operation the test gas flows only across a part of the sensor surface. The other part is flushed.

7 Claims, 1 Drawing Sheet

SNIFFING LEAK DETECTOR

BACKGROUND

1. Field of the Invention

The disclosure is directed to a sniffing leak detector comprising a test gas sensor, and in particular to a sniffing leak detector with a large measurement range of leakage rates.

2. Discussion of the Background Art

Patent Application DE 10 2005 021 909 (not pre-published) describes a sniffing leak detector comprising, for example, a test gas sensor, wherein a sniffing probe is connected to the test gas sensor via a sniffing line. A vacuum pump creates a vacuum in a suction chamber provided in front of the quartz window of the test gas sensor. This sniffing leak detector allows different modes of operation, namely normal, standby, protection against contamination and simulation of a gross leak. In the mode for protection against contamination, a venting valve is temporarily connected to the suction chamber of the test gas sensor, thereby causing a flushing effect.

The conventional analysis apparatus for sniffing leak detection with a high detection sensitivity for helium employs mass-spectroscopy methods for detection. These require high vacuum conditions of $p<10^{-4}$ mbar. Such pressure conditions are obtained using a pump system requiring a turbomolecular pump. This kind of pump is complex. Further there are sudden failures because of fused filaments of the mass spectrometer.

The Patent Application 10 2005 021 909 mentioned above describes a sniffing leak detector with a test gas sensor adapted to detect helium leakage rates in a range from $10^{-7}$ mbar l/s to $10^{-3}$ mbar l/s. For smaller leakage rates, the detection range is restricted due to the limited signal stability or the limited sensitivity. For higher leakage rates, the limitation is defined by a possible contamination of the sensor. At a measured leakage rate of $10^{-3}$ mbar l/s, the helium partial pressure in front of the sensor is about 0.05 mbar. The sensor must be protected against helium partial pressures above this limit. This is achieved by changing over the gas guide so that, upon exceeding the fixed signal intensity, the apparatus temporarily switches off the detection of helium.

It is an object of the disclosure to provide a sniffing leak detector having a widened leakage rate measurement range.

SUMMARY

A first variant of the sniffing leak detector according to the present disclosure comprises a flow divider allows to simultaneously connect the sniffing line to the suction chamber of the test gas sensor via a suction line and to the vacuum line via the open valve.

The disclosure allows to detect leakage rates by conducting a part of the sucked-in gas to the gas feed pump and conducting a smaller part to the sensor.

A second variant provides that the sniffing line is connected with a valve means selectively connecting the sniffing line to one of a plurality of inlets of the suction chamber, these inlets causing flow paths of different lengths along the sensor surface of the test gas sensor. This variant may be referred to as a "partial surface variant".

In both variants it is advantageous for the suction chamber arranged downstream of the test gas sensor to be connected to a venting valve through which ambient air can be sucked in. In this way, helium can be flushed away from the sensor surface. Preferably, the venting valve is connected to the gas guide in series with a throttle.

A desired working pressure of about 250 mbar can be generated and maintained in front of the sensor surface by a suitable valve/throttle system.

BRIEF DESCRIPTION OF THE DRAWINGS

The following is a detailed description of embodiments of the disclosure with reference to the drawings.

In the Figures.

DETAILED DESCRIPTION OF THE PREFERRED EMBODIMENT

Figure 1:
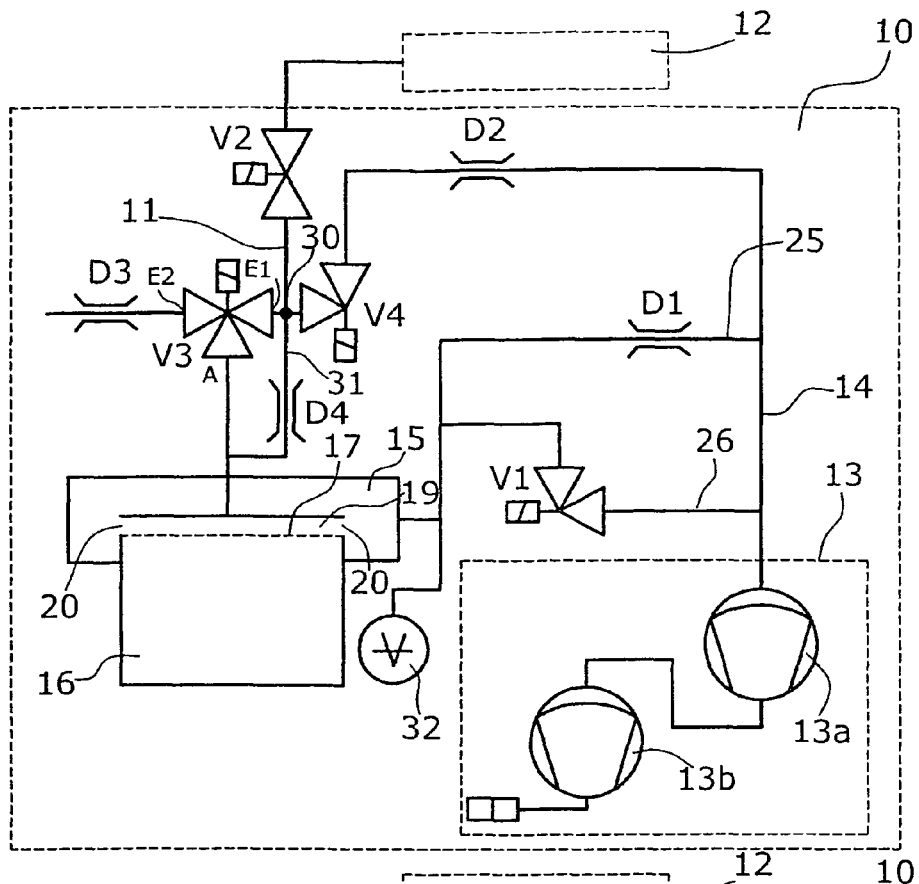
FIG. 1 a diagram of a first embodiment referred to as the flow division variant, and FIG. 2 a diagram of a second embodiment referred to as the partial surface variant.

The flow division variant illustrated in FIG. 1 comprises a basic unit 10 connected to a sniffing probe 12 via a valve V2. The sniffing probe 12 may be guided manually to check a test object for leaks from which a test gas escapes.

The basic unit 10 includes a vacuum pump 13 which, in the present case, is a two-stage pump with the pump stages 13$a$ and 13$b$ designed as diaphragm pumps. The vacuum pump generates a final pressure of about 3 mbar.

A vacuum line 14 leads from the vacuum pump 13 to the suction chamber 15. The suction chamber 15 is formed in front of the test gas sensor 16. The walls of the suction chamber 15 abut the housing of the test gas sensor 16. The sensor surface 17 of the test gas sensor 16 is enclosed by the suction chamber 15. Within the suction chamber 15 a gas guide plate 18 is provided that is located at a distance opposite the sensor surface 17 and in parallel therewith. The sensor surface 17 and the gas guide plate 18 define the gas guide chamber 19. The sniffing line 11 ends in the gas guide chamber 19. The same has lateral openings 20 at opposite ends thereof through which gas can enter into the suction chamber 15. The gas guide chamber 19 causes a spreading of the gas in front of the sensor surface 17.

The test gas sensor 16 is configured like the sensor described in DE 100 31 882 A1. The sensor surface 17 is a membrane selectively permeable to helium. Moreover, the test gas sensor 16 includes a Penning pressure sensor or another pressure sensor generating an electric signal indicating the pressure in the housing closed by a quartz membrane. From this pressure the signal for the detected amount of test gas is derived.

The vacuum line 14 includes a first throttle D1 between the vacuum pump 13 and the suction chamber 15, which throttle determines the throughput for the normal mode of operation. The first throttle D1 is shunted by a bypass line 26 including a valve V1.

A throttle D3 is provided in an air inlet line. The valve V3 connects either the inlet E1 or the inlet E2 with the outlet A. The -inlet E1 is connected to a flow divider 30 connected to the inlet of the test gas sensor 16 through a line 31. The line 31 includes a throttle D4.

Another duct leads from the flow divider 30 via a valve V4 and a throttle D2 to the vacuum line 14. The throttles D2 and D4 are matched such that the flow through D2 is substantially larger than the flow through D4. The flow through D2 is at least 10 times that through D4 and in particular at least 50 times larger. Preferably, the flow through D2 is about a hundred times the flow through D4.

A pressure gauge 32 is connected to the suction chamber 15.

In normal operation of the flow division mode, the gas drawn in through the sniffing line 11 via the open valve V2 is guided through the valve V3 to the test gas detector 16. The valve V4 is closed. Using the valve/throttle system V1, D1, a working pressure of about 250 mbar is maintained in front of the sensor surface 17.

When the concentration of the test gas in the sniffed gas exceeds a predetermined limit, the system automatically switches to the gross mode. Here, the sniffed gas is guided through the valve V2 to the line 31 via the flow divider 30. At the branch point 30, a first partial flow and a second partial flow are formed at the same time, the first partial flow being formed via the throttle D4 and the second partial flow being formed via the valve V4 and the throttle D2. The smaller flow that reaches the test gas sensor 16 via the throttle D4 is guided along the sensor surface 17 to the vacuum pump 13.

During the gross operation mode, the valve V3 is switched to the inlet E2, whereas the inlet E1 is blocked. Air is drawn in via the inlet E2. Thereby, a fast exchange of gas is achieved in front of the sensor surface 17 using the air as a flushing gas. The throttles D2, D3 and D4 are dimensioned such that the desired flow ratio is realized, e.g. a ratio of 1:100.

The additional flush gas flow through the throttle D3 causes a complete exchange of the gas in front of the sensor surface 17 within a short time. This fast exchange would not be achieved with a flow exclusively passing through the throttle D4.

Figure 2:
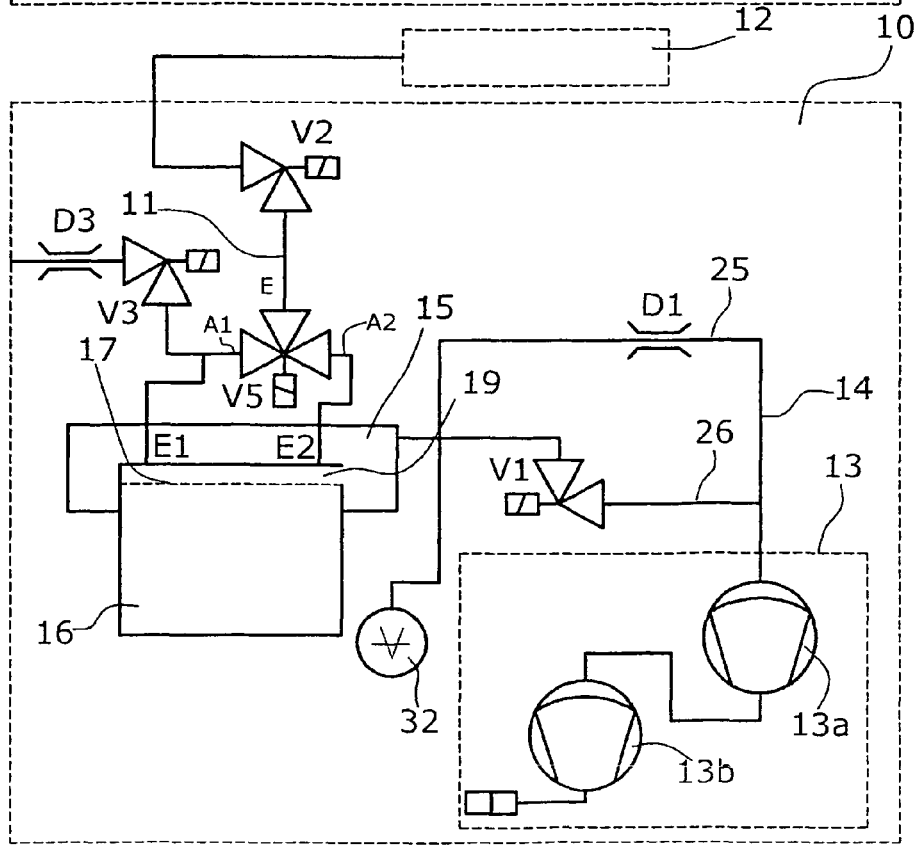

The embodiment in FIG. 2 corresponds to the partial surface variant, where in the gross mode of operation the test gas flows only across a fraction of the sensor surface 17. Those components of the second variant that are also present in the first variant will not be explained again hereunder so that the following description is restricted to the differences.

According to FIG. 2, at a position behind the valve V2, the sniffing line 11 is connected with the inlet E of a valve V5 having two outlets A1 and A2. The outlets A1, A2 are connected to different inlets E1, E2 of the gas guiding space 19. The first inlet E1 is located at the end of the sensor surface 17 averted from the opening 20, whereas the inlet E2 is closer to the opening 20. In the present embodiment at least one opening 20 is provided at only one end of the test gas sensor 16 so that the inflowing gas has to travel paths of different lengths to the opening 20, depending on the position of the respective inlet. The venting valve V3 is connected to the inlet E1 corresponding to the longer flow path along the sensor surface 17.

In normal operation of the partial surface mode in FIG. 2 the gas sucked in by the sniffing probe 12 is guided to the test gas sensor 16 via the valve V2 and then via the valve V5. The valve V5 is set to the position E-A1 so that the gas is supplied to the inlet E1 of the test gas sensor and passes across the entire sensor surface 17. In front of the sensor 16 a working pressure of about 250 mbar is maintained.

In the gross operation mode the valve V5 is in the position E-A2 and gas is supplied to the right inlet E2 of the test gas sensor 16. From there, the gas flows only across a part of the sensor surface 17. Thereafter, the gas directly reaches the pump system. With the inlet above the throttle D3 and the valve V3, an additional airflow is created along the sensor surface 17, thereby preventing helium from accumulating in front of the sensor or that high test gas concentrations dwell there.

It is also possible to combine both variants described.

What is claimed is:

1. A sniffing leak detector with a test gas sensor, a sniffing probe connected to the test gas sensor via a sniffing line, a vacuum line, a suction chamber arranged in front of the sensor surface of the test gas sensor, said suction chamber being connected to the vacuum line and a valve that is adapted to connect the sniffing line to the vacuum line, wherein the sniffing line is connected to a valve device selectively connecting the sniffing line to one of a plurality of inlets of the test gas sensor, these inlets causing flow paths of different lengths across the sensor surface.

2. The sniffing leak detector of claim 1, wherein a vacuum line leading from a vacuum pump to the suction chamber includes a first throttle, and wherein the first throttle can be shunted by an unrestricted bypass line including a valve.

3. The sniffing leak detector of claim 2, wherein a normal operation mode is provided in which the bypass line is blocked and a first line is open.

4. The sniffing leak detector of claim 2, wherein a contamination protection mode is provided in which the bypass line and a first line are open.

5. The sniffing leak detector of claim 1, wherein the suction chamber is connected to a venting valve.

6. The sniffing leak detector of claim 5, wherein the venting valve is connected, in series with a throttle, to a gas guiding chamber of the test gas sensor.

7. The sniffing leak detector of claim 1, wherein a contamination protection condition is provided in which a valve in the sniffing line is closed.

* * * * *